(12) United States Patent
Hyatt et al.

(10) Patent No.: US 7,229,135 B2
(45) Date of Patent: Jun. 12, 2007

(54) BUCKLE ASSEMBLY

(75) Inventors: John Hyatt, Windsor (CA); Ashok Kalwad, Pontiac, MI (US)

(73) Assignee: Autoliv ASP, Inc., Ogden, UT (US)

( * ) Notice: Subject to any disclaimer, the term of this patent is extended or adjusted under 35 U.S.C. 154(b) by 135 days.

(21) Appl. No.: 11/119,595

(22) Filed: May 2, 2005

(65) Prior Publication Data

US 2006/0255647 A1 Nov. 16, 2006

(51) Int. Cl.
*B60R 22/18* (2006.01)
*B60R 21/00* (2006.01)

(52) U.S. Cl. ....................................... 297/481
(58) Field of Classification Search ................ 297/481
See application file for complete search history.

(56) References Cited

U.S. PATENT DOCUMENTS

| | | | | |
|---|---|---|---|---|
| 4,118,068 A | * | 10/1978 | Fohl | 297/481 |
| 4,132,434 A | * | 1/1979 | Takahashi et al. | 297/481 |
| 4,542,939 A | * | 9/1985 | Geoffrey | 297/481 |
| 4,560,203 A | * | 12/1985 | Huber | 297/481 |
| 4,682,789 A | * | 7/1987 | Higuchi et al. | 297/481 X |
| 4,810,037 A | * | 3/1989 | Takagi | 297/481 |
| 4,919,488 A | * | 4/1990 | Deegener et al. | 297/481 X |
| 5,009,469 A | * | 4/1991 | Mouri | 297/481 X |
| 5,044,695 A | * | 9/1991 | Tsuchiya | 297/481 |
| 5,139,311 A | * | 8/1992 | Imai et al. | 297/481 |
| 5,236,220 A | * | 8/1993 | Mills | 297/481 X |
| 5,332,261 A | * | 7/1994 | Siepierski | 297/481 X |
| 6,412,876 B2 | * | 7/2002 | Nishide | 297/481 X |

FOREIGN PATENT DOCUMENTS

| | | | | | |
|---|---|---|---|---|---|
| DE | 3509984 A1 | * | 6/1986 | | 297/481 |
| GB | 2261809 A | * | 6/1993 | | 297/481 |
| JP | 03276847 A | * | 12/1991 | | 297/481 |
| JP | 04266552 A | * | 9/1992 | | 297/481 |
| JP | 05147499 A | * | 6/1993 | | 297/481 |

* cited by examiner

*Primary Examiner*—Rodney B. White
(74) *Attorney, Agent, or Firm*—Sally J Brown; Brinks Hofer Glison & Lione

(57) ABSTRACT

A buckle assembly for a motor vehicle belt restraint system. The buckle assembly includes a mounting plate and a buckle strap carrying the buckle which is rotatably affixed to the mounting plate. A torsion spring acts on the buckle strap to rotationally bias it toward a desired position. The buckle assembly includes a retainer for maintaining the buckle strap in a mounting position, allowing convenient mounting of the device to the motor vehicle structure. Following mounting, the retainer is released to enable the buckle strap to move to its normal range of positions, allowing the buckle assembly to operate in its normal manner.

21 Claims, 5 Drawing Sheets

BUCKLE ASSEMBLY

FIELD OF THE INVENTION

This invention relates to a motor vehicle seat belt occupant protection system, and particularly to a buckle assembly for use in such systems.

BACKGROUND OF THE INVENTION

Modern motor vehicles are equipped with occupant impact protection systems. Various types of such systems are presently in use, including so-called active devices such as manually deployed seat belts, and passive restraint systems, such as inflatable air-bags, side curtains, etc. Even when passive restraints are provided, occupants of passenger motor vehicles are provided with an actively deployed seat belt system, typically involving a lap and shoulder belt combination. Seat belt webbing retractors mounted to the seat or body structure of the vehicle allow the seat belts to be extracted from and retracted into the retractors when they are being used, and stowed when not in use.

Motor vehicle manufacturers are constantly striving to enhance the comfort and convenience afforded for vehicles occupants, as well as improving the esthetics of the motor vehicle interior. Various designs of seat belt assemblies are used, but generally they use a buckle positioned to the "bight" area or crease between the seat cushion and seat back. The lap and shoulder belt latch plate is fastened to the buckle when the belts are worn. In many designs, the buckle is attached to a short length of seat belt webbing. Unfortunately, buckles mounted in this manner often become lost under the seat cushion and inaccessible or difficult to access by the seat occupants. Other designs mount the buckle to rigid or semi-rigid stalks, such as plastic coated cables causing the buckle to be held in an upward protruding position. Although such designs provide buckle accessibility, the buckles may become an obstruction when not being used by an occupant, and their positioning negatively affects the esthetics of the vehicle interior.

To address the shortcomings of prior art buckle mounting systems mentioned above, more recent generations of designs incorporate a buckle which is mounted to a hinge for pivoting motion. These designs are especially prevalent for second and third row occupant seat applications. In one example of such applications, when the seat belt latch plate is not attached to the buckle, the buckle lies in a folded position under the influence of a spring to lie within a pocket formed in the seat cushion. The buckle may be grasped by the user and rotated to an upward position within a range of pivoted positions where it is positioned to receive the latch plate. When the latch plate is disengaged from the buckle, the seat belt buckle recedes under the influence of a torsion spring into its stowed position in the pocket. This provides a trim and orderly appearance of the buckles when the seat is unoccupied.

In other applications, a pivoting buckle assembly is used which is biased to an upward pivoted position to receive the latch plate (use position). The pivoting movement in such applications may be provided to accommodate folding seat backs or for other reasons. For use in folding seat back applications, the folding of a seat component may act on the pivoting buckle causing it to be folded toward a flat condition.

The previously mentioned pivoting buckle assemblies are known in the prior art. Although they operate successfully, difficulties are encountered in mounting these devices during the assembly of the vehicle. In the position of the buckle established by the influence of a torsion spring, the mounting aperture and mounting fastener for the buckle mounting plate may not be readily accessed. In such instances, the assembly operator must pivot the buckle assembly against the torsion spring tension in order to gain access to the mounting fastener and aperture. This complicates the assembly process.

In view of the foregoing, there is a need in the art to provide a pivotable buckle assembly for automotive restraint systems which can be maintained in a mounting position for convenient access for mounting features, yet can be actuated or released to a normal usage condition in which it is biased to a desired position under the influence of the torsion spring. Preferably, the device for providing such retention in the mounting position should not incorporate additional components or generate broken pieces which could remain in the vehicle and become a source of later problems.

SUMMARY OF THE INVENTION

The buckle assembly in accordance with the present invention provides a retainer mechanism which enables the buckle strap to be maintained in a mounting condition until after installation, when it may be used in the normal manner enabling the buckle strap to move within its normal range of motion. Two distinct embodiments for retainer systems in accordance with this invention are described. In one embodiment, the retainer utilizes a bushing, preferably formed from a polymeric plastic material having two sections, each respectively coupled for rotation to the mounting bracket and buckle strap, and having a frangible connection between them. When the buckle is assembled, the parts are held in a mounting position, providing convenient mounting to the vehicle. Following mounting, the frangible connection is easily broken by forcing the buckle toward its normal range of positions. Once the frangible connection is broken, the buckle assembly operates in its normal manner, pivotable within its range of motion while biased by the torsion spring.

In a second embodiment of a buckle assembly in accordance with this invention, a retainer mechanism is provided in which an end of the torsion biasing spring interacts with the mounting bracket in such a manner as to maintain the parts in a mounting position, yet can be actuated or released to allow the buckle to operate over the normal range of pivoted positions under the influence of the torsion spring.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

Figure 1:
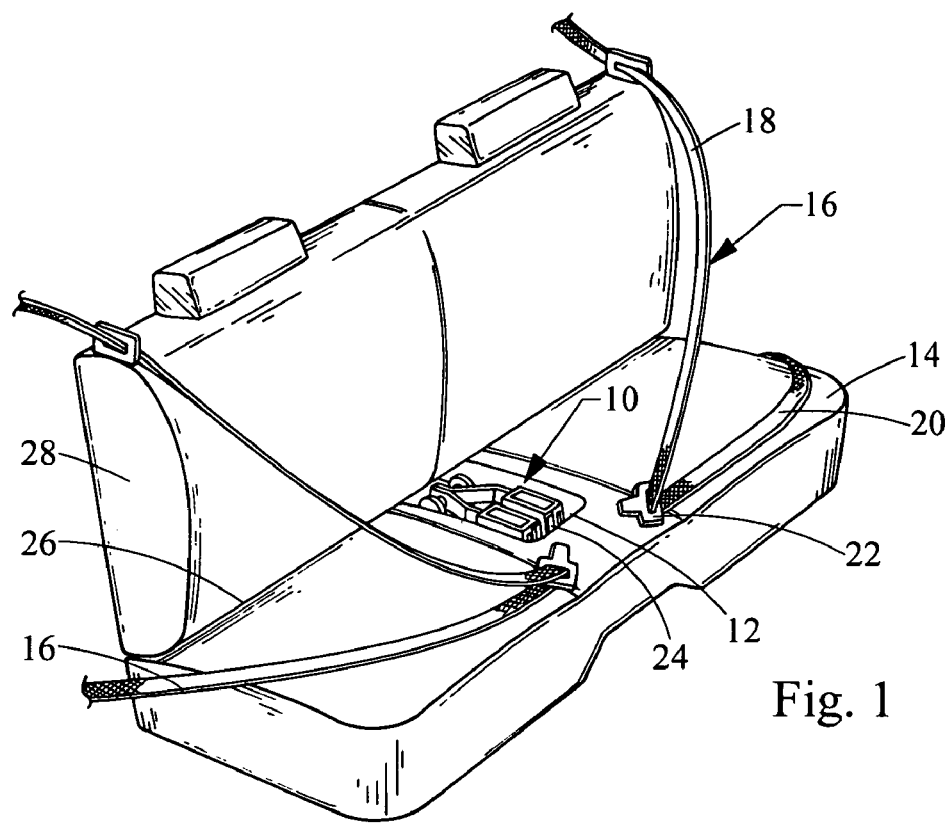
FIG. 1 is a pictorial view of a second row seat of a motor vehicle showing a buckle assembly in accordance with this invention for use with a lap and shoulder belt system illustrated in the unlatched, unused condition.
Figure 2:
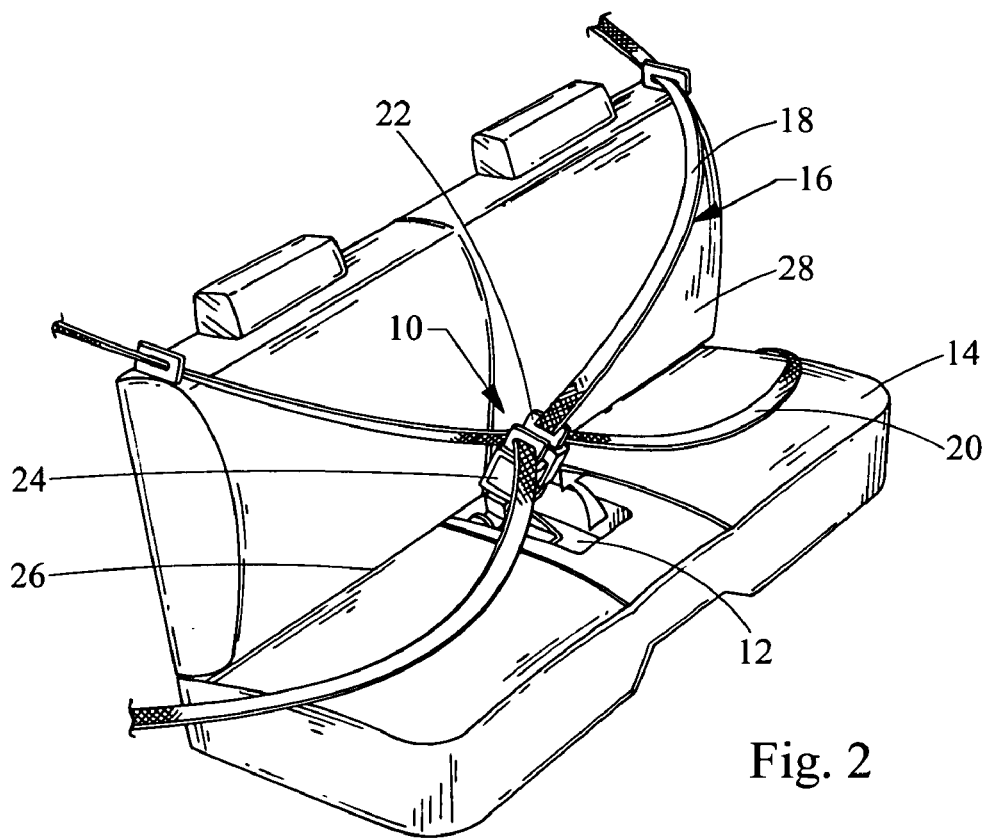
FIG. 2 is a figure similar to FIG. 1, but showing the buckle assembly affixed to the latch plate and showing the buckle rotated to an upward pivoted usage position.

FIGS. 1 and 2 illustrate the general environment of application of the present buckle assembly. As shown by those figures, buckle assembly 10 is shown positioned within cushion pocket 12 of a seat cushion 14. Lap and shoulder belt assembly 16 includes an upper shoulder belt portion 18 and a lower lap belt portion 20. The belt assembly 16 is fastened to buckle assembly 10 by affixing latch plate 22 within the buckle 24. As shown, buckle assembly 10 is mounted adjacent the "bight" or crease area 26 between seat cushion 14 and seat back 28.

FIG. 1 illustrates buckle assembly 10 in its normal stowage position in which buckle 24 is pivoted forward and fits within cushion pocket 12. FIG. 2 illustrates the upward deflected position of buckle 24 when latch plate 22 is fastened to the buckle.

Figure 3:
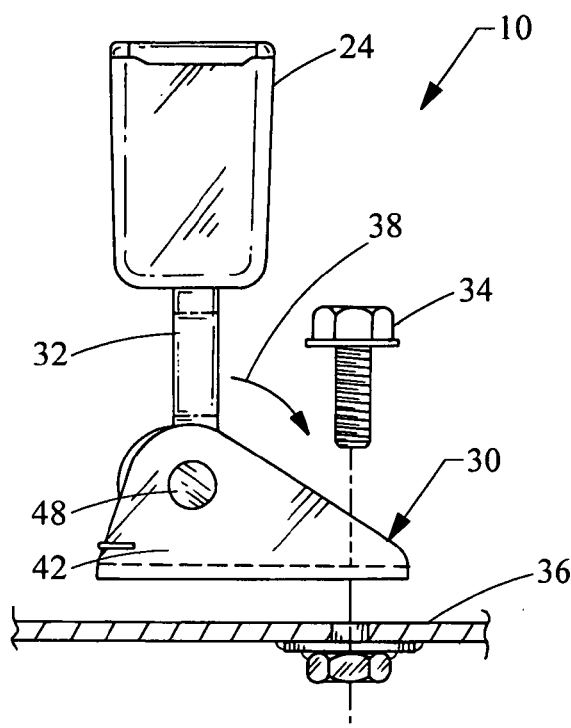
FIG. 3 is a side view of the buckle assembly in accordance with a first embodiment of this invention adapted for use with the seat belt system shown in FIGS. 1 and 2.

FIG. 3 illustrates the basic components of buckle assembly 10. Buckle assembly 10 generally comprises mounting bracket 30 with buckle strap 32 to which buckle 24 is attached. As shown, fastener 34 is used to fasten mounting bracket 30 to vehicle structure 36. As shown by the figure, arrow 38 indicates that buckle strap 32, with buckle 24, are biased toward a forward rotated position in the direction of the arrow. In order to provide convenient access for a tool to engage mounting fastener 34, it is necessary to rotate buckle 24 and buckle strap 32 to the upwardly deflected pivoted position shown in FIG. 3. Fastener 34 passes through mounting bracket aperture 35. As mentioned previously, a principal feature of this invention is to accommodate such access and fastening.

It should be noted that, in other applications, the position shown in FIG. 3 may represent the normal position of buckle 24 established by the influence of the biasing spring, and access for fastening may require folding of the buckle in the direction of arrow 38 against spring torsion.

FIGS. 4 through 10 illustrate in more detail buckle assembly 10 in accordance with the first embodiment of this invention. As illustrated, mounting bracket 30 features a pair of upstanding walls 42 and 44. Buckle strap 32 incorporates a central hole 46 through which a pivot pin in the form of rivet 48 is installed. This arrangement allows buckle straps 32 to rotate relative to mounting bracket 30 about the rotational axis established by rivet 48. Torsional coil spring 50 includes end 52 which engages mounting bracket 30 and opposing end 54 which engages with buckle strap 32 to provide the rotational biasing previously described.

Figure 6:
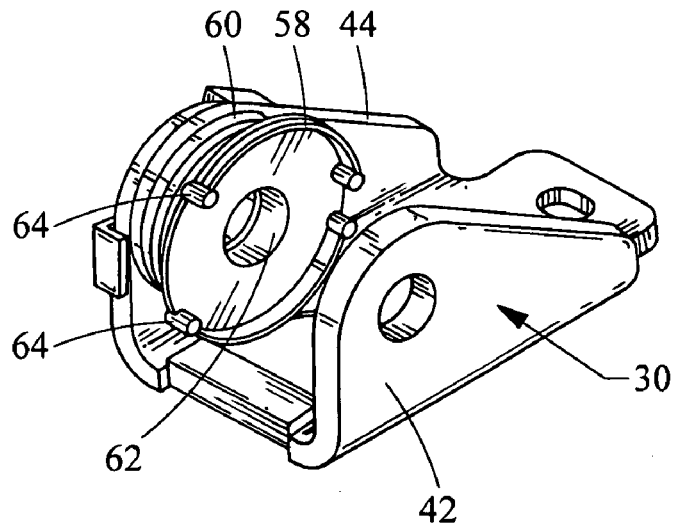
FIG. 6 is a partial view of a subassembly of the buckle assembly shown in FIGS. 4 and 5.
Figure 7:
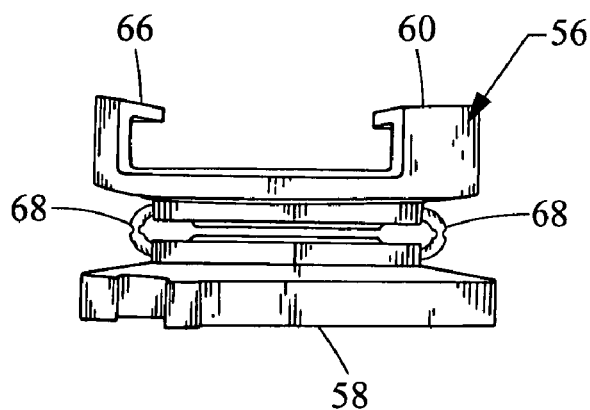
FIG. 7 is a side view of the release bushing assembly used in the buckle assembly illustrated in the prior figures.
Figure 8:
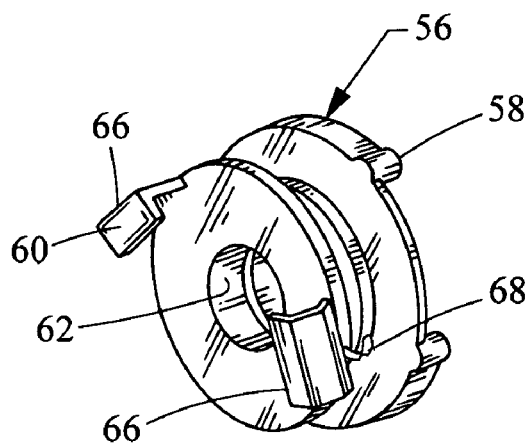
FIG. 8 is a pictorial view of the bushing assembly shown in FIG. 7.
Figure 9:
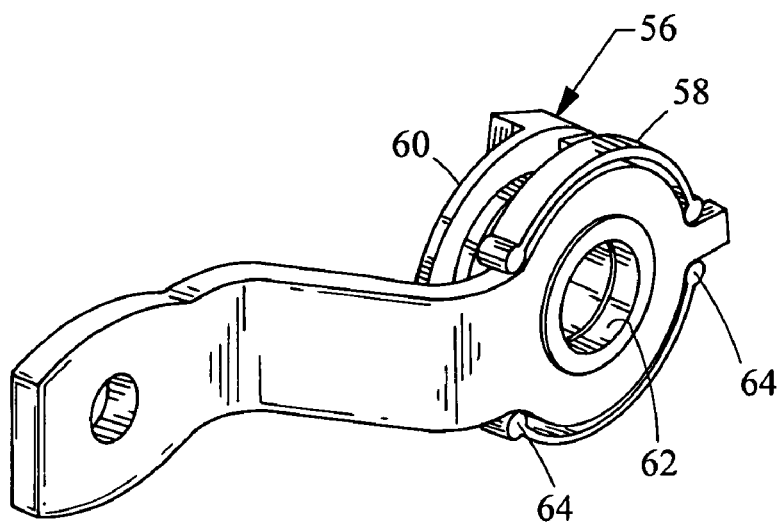
FIG. 9 is a side pictorial view illustrating the mounting strap and bushing components.
Figure 10A:
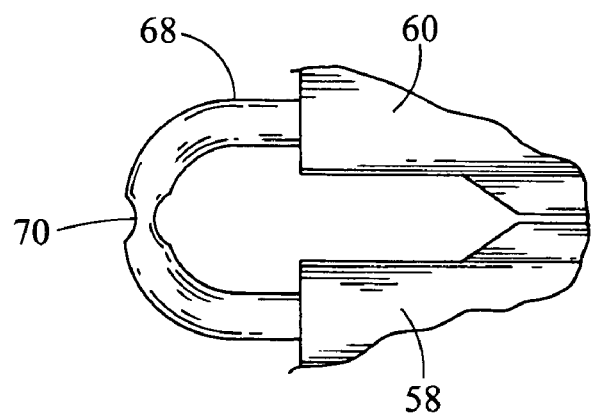
FIGS. 10A and 10B show the frangible connecting strips of the retainer bushing in an intact and failed conditions, respectively.

In accordance with a principal feature of this invention, buckle assembly 10 further features a retainer means in the form of retainer bushing 56, best shown by FIGS. 6, 7, and 8, which includes spaced apart washer-shaped retainer portions 58 and 60, each forming hole 62 through which rivet 48 passes. Retainer portion 58 includes posts 64 which embrace buckle strap 32 so that both parts rotate together about rivet 48. Retainer portion 60 includes ears 66 which engage with features of mounting bracket 30, preventing the retainer portion 60 from rotating relative to the mounting bracket. Retainer bushing portions 58 and 60 are stacked against one another as shown in FIGS. 7 and 8. They are, however, maintained in a set relatively rotated indexed position by a pair of connecting straps 68 shown in FIG. 10A. As illustrated in FIG. 10A, connecting straps 68 includes a narrowed-down failure region 70 which, for purposes to be described below, is frangible or breakable when desired.

Figure 4:
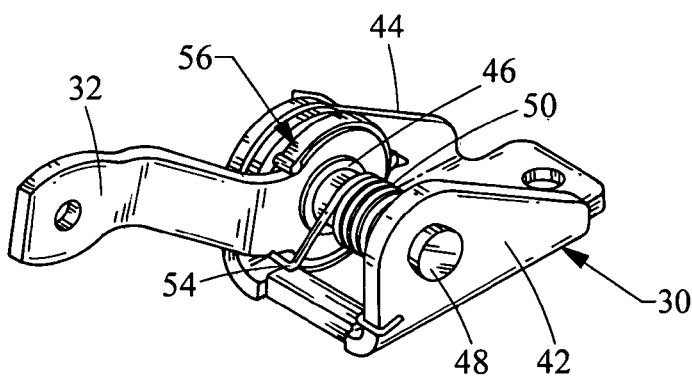
FIG. 4 is a partial pictorial view of a first embodiment of a belt buckle assembly in accordance with this invention.
Figure 5:
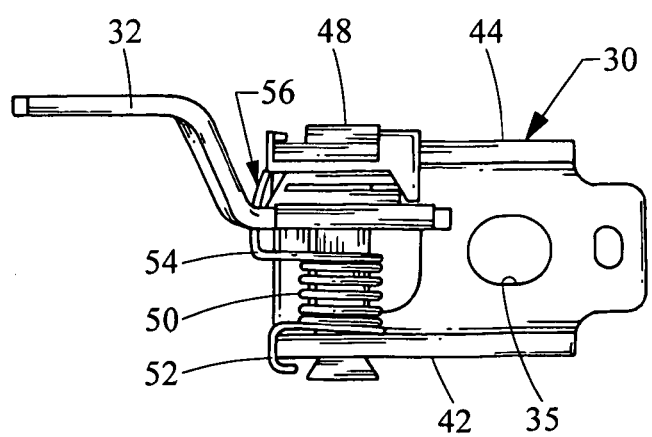
FIG. 5 is a top view of the buckle assembly shown in FIG. 4.
Figure 10B:
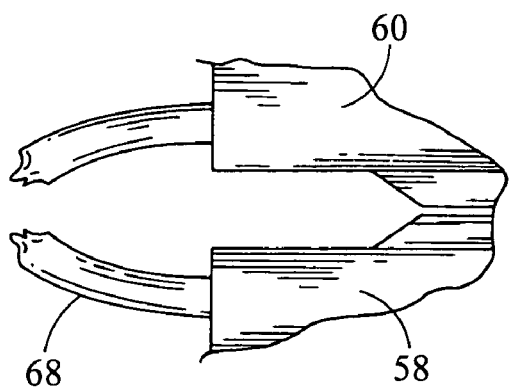

The orientation of retainer bushing portions 58 and 60 is such that during assembly, buckle strap 32 is maintained in a particular indexed mounting position such as the positions illustrated in FIGS. 3 and 4 in which the buckle strap and associated buckles 24 are rotated to an "open" position within its range of pivoted positions displaced from the stowage position against the biasing of spring 50. This position allows access to aperture 35 and fastener 34. Following the assembly process, buckle 24 may be urged forcibly toward a folded forward position which causes connecting strap failure region 70 to fail, as indicated in FIG. 10B. Upon this failure, retainer portions 58 and 60 are no longer mechanically connected to rotate together, and thus buckle strap 32 is free to rotate relative to mounting bracket 30 under the influence of torsional spring 50 or externally applied forces. Thus, after buckle assembly 10 is "released" in this manner, it is able to operate in a normal mode, pivoting between the position shown in FIG. 1 and to position within a range of pivoted positions, as shown in FIG. 2.

As mentioned previously, the assembly position of buckle assembly 10 may be folded flat, to the position shown in FIG. 4. In such case, retainer bushing 56 maintains the buckle assembly in the position of FIG. 4, until it is released, enabling the buckle strap 32 to rotate upwardly under the influence of spring 50.

Preferably, the material selected for retainer bushing 56 does not produce loose parts when connecting strap 68 is caused to fail. Retainer bushing 56 is preferably formed as a unitary structure by injection molding or other processes using a polymeric resin or other material.

Figure 11:
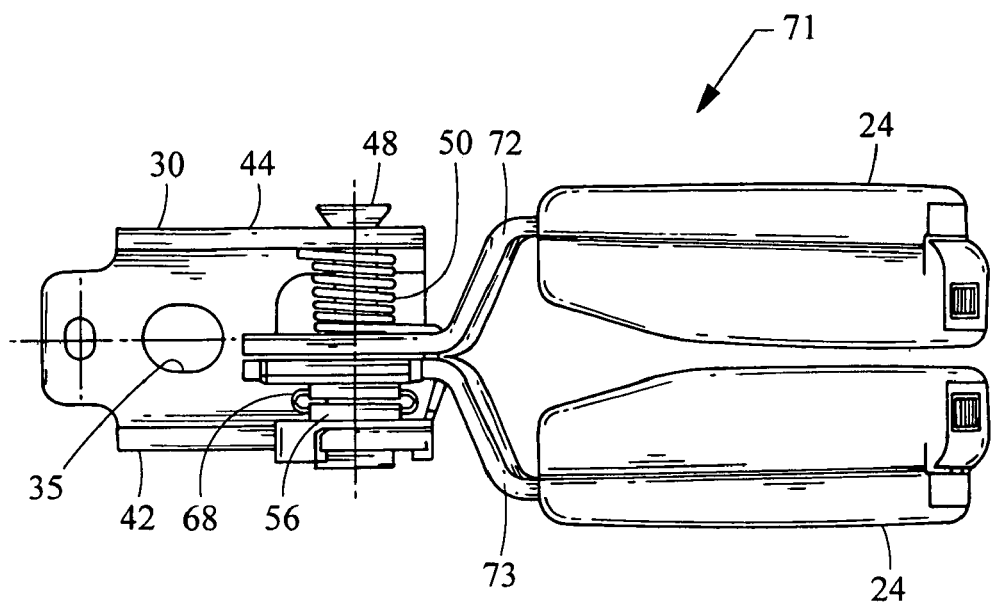
FIG. 11 illustrates a buckle assembly providing a pair of buckles.

FIG. 11 illustrates a buckle assembly 71 incorporating a pair of mounting straps 72 and 73, for a pair of buckles 24. Both mounting straps 72 and 73 may rotate together and use a single retainer bushing 56 as shown, or the straps could be independently pivotable, with separate retainer bushings provided for each. Buckle assembly 71 operates in a manner identical to buckle assembly 10, except that two buckles 24 are provided. Components of buckle 71, along with the additional embodiment illustrated by FIG. 12 which are identical to components previously described, are identified by reference numbers used in the above description.

Figure 12:
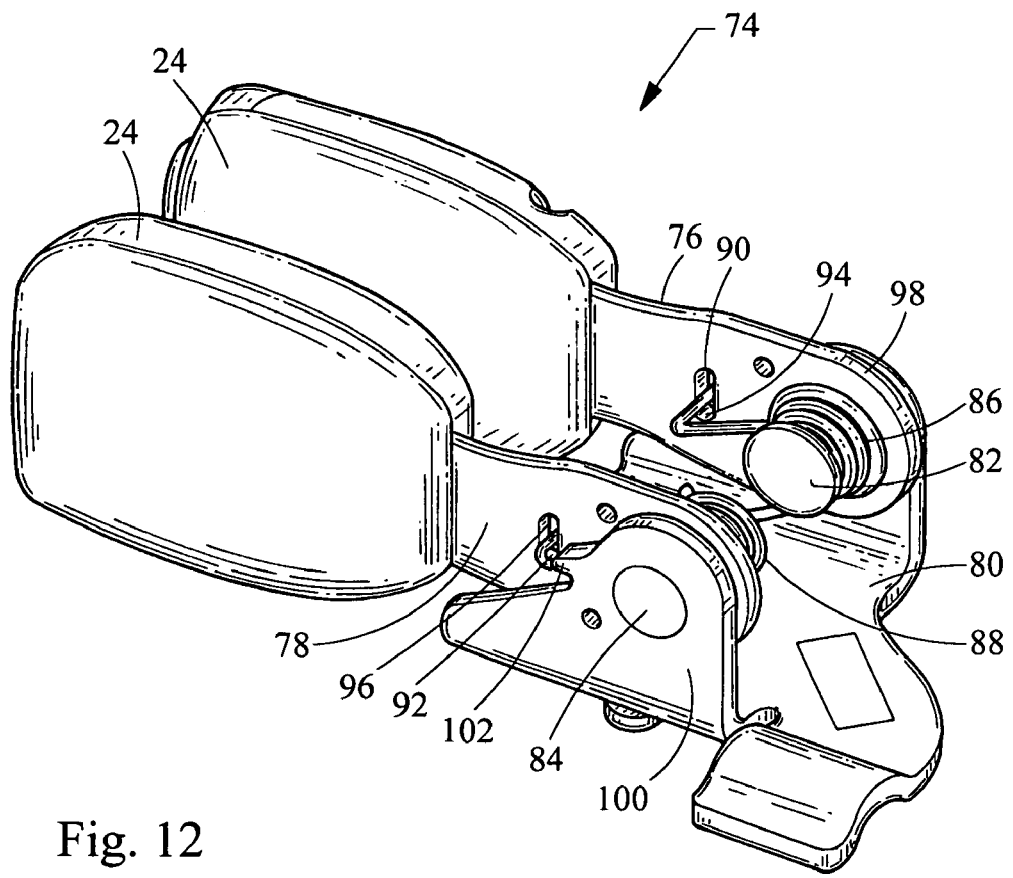
FIG. 12 is a pictorial view of the buckle assembly in accordance with a second embodiment of this invention.

Now with reference to FIG. 12, the second embodiment of buckle assembly 74 is illustrated. In the case of buckle assembly 74, each buckle 24 is able to move independent of one another using separated buckle straps 76 and 78. Buckle assembly 74 includes mounting bracket 80 and a pair of pivot pins in the form of rivets 82 and 84. Torsional coil springs 86 and 88 are provided for rotational biasing in the manner as described in connection with the first embodiment. Each of coil springs 86 and 88 includes extending ends 90 and 92, respectively, extending through apertures 94 and 96, respectively. The other ends of coil springs 86 and 88 engage with mounting bracket 80 in the manner of the prior embodiment. Mounting bracket 80 sidewalls 98 and 100 include protruding projections or ears 102.

As illustrated in FIG. 12, spring ends 90 and 92 extend through apertures 94 and 96 in buckle strap 76 and 78, and engage with ears 102 and 104. This engagement causes buckle straps 76 and 78 to be maintained in the folded flat, pivoted mounting position shown in FIG. 12 which provides convenient access for mounting as previously described. After assembly, buckles 24 may be forcibly moved toward the upward position, which is in the clockwise direction with regard to the orientation of elements shown in FIG. 12. This movement causes spring ends 90 and 92 to ride over ears 102, allowing the coil springs 86 and 88 to bias their respective buckle straps 76 and 78 in a normal manner between the folded flat mounting position and upwardly pivoted positions within a range of positions, as explained in connection with the first embodiment. Coil springs 86 and 88 urge buckle straps 76 and 78 to a normal, use position which is upwardly pivoted.

While the above description constitutes the preferred embodiment of the present invention, it will be appreciated that the invention is susceptible to modification, variation and change without departing from the proper scope and fair meaning of the accompanying claims.

The invention claimed is:

1. A seat belt buckle assembly for a motor vehicle for attachment to a seat belt latch plate, comprising:
    a mounting bracket having a mounting aperture for receiving a fastener for affixing the mounting bracket to the vehicle,
    a buckle strap having a buckle affixed thereto for fastening to the latch plate, the buckle strap being pivotably connected to the mounting bracket between a full range of pivoted positions,
    a torsional biasing spring acting on the buckle strap, the buckle strap being rotatable against the torsional biasing of the spring within the range of pivoted positions, and
    a releasable retainer means for maintaining the buckle strap in a mounting position having less than the full range of pivoted positions enabling access to the mounting aperture, the retainer means being attached between the mounting bracket and the buckle strap to resist the torsional biasing of the spring and being releasable to enable the buckle strap to be moved to positions in the full range of pivoted positions.

2. The seat belt buckle assembly according to claim 1 wherein the retainer means comprises a retainer bushing having a first retainer portion fixed to the buckle strap and a second retainer portion fixed to the mounting bracket and having a frangible connector between the first and second retainer portions, the frangible connector causing the buckle strap to be maintained in the mounting position, and upon being caused to fail, allowing the buckle strap to move to the positions within the range of pivoted positions.

3. The seat belt buckle assembly according to claim 2 wherein the retainer bushing first portion has first engagement features for preventing relative rotation between the first portion and the buckle strap.

4. The seat belt buckle assembly according to claim 2 wherein the retainer bushing second portion has second engagement features for preventing relative rotation between the second portion and the mounting bracket.

5. The seat belt buckle assembly according to claim 2 wherein the frangible connector comprises a strap bridging the first and second retainer portions.

6. The seat belt buckle assembly according to claim 5 wherein the retainer bushing is a unitary structure.

7. The seat belt buckle assembly according to claim 1 further comprising a pivot pin for connecting the mounting bracket end the buckle strap and permitting the pivotable motion therebetween.

8. The seat belt buckle assembly according to claim 7 wherein the spring comprises a torsional coil spring wrapped around the pivot pin and having a first end engaging the buckle strap and a second end engaging the mounting bracket.

9. The seat belt buckle assembly according to claim 1 wherein the buckle assembly further comprises a retainer means comprising a pivot pin for connecting the mounting bracket and the buckle strap and permitting the pivotable motion therebetween and the spring being a torsional coil spring wrapped around the pivot pin and having a first end engaging the buckle strap and a second end engaging the mounting bracket, the coil spring first end further engaging a surface of the mounting bracket maintaining the buckle strap in the mounting position and being disengageable from the surface to allow the buckle strap to move from the mounting position to positions within the range of pivoted positions.

10. The seat belt buckle assembly according to claim 9 wherein the surface is a projection.

11. The seat belt buckle assembly according to claim 1 further comprising the buckle assembly having a pair of buckles linked together for movement together.

12. A seat belt buckle assembly of a motor vehicle for attachment to a seat belt latch plate, comprising:
    a mounting bracket having a mounting aperture for receiving a fastener for affixing the mounting bracket to the vehicle,
    a buckle strap having a buckle affixed thereto for fastening to the latch plate, the buckle strap being pivotably connected with the mounting bracket about a pivot pin between a range of pivoted positions,
    a torsional coil biasing spring wrapped around the pivot pin and urging the buckle strap, the buckle strap rotatable against the torsional biasing of the spring to a mounting position within the range of pivoted positions for enabling fastening of the latch plate to the buckle, and
    a retainer bushing having a first portion fixed to the buckle strap and a second portion fixed to the mounting bracket and having a frangible connector between the first and second portions, the frangible connector causing the buckle strap to be maintained in the mounting position and upon being caused to fail allowing the buckle to move to positions within the range of pivoted positions.

13. The seat belt buckle assembly according to claim 12 wherein the frangible connector comprises a strap bridging the first and second retainer bushing portions.

14. The seat belt buckle assembly according to claim 12 wherein the retainer bushing is a unitary structure.

15. The seat belt buckle assembly according to claim 12 wherein the torsional coil spring having a first end engaging the buckle strap and a second end engaging the mounting bracket.

16. The seat belt buckle assembly according to claim 12 further comprising the buckle assembly having a pair of buckles linked together for movement together.

17. The seat belt buckle assembly according to claim 12 further comprising the buckle assembly having a pair of buckles which are pivotable independently.

18. A seat belt buckle assembly of a motor vehicle for attachment to a seat belt latch plate, comprising:
   a mounting bracket having a mounting aperture for receiving a fastener for affixing the mounting bracket to the vehicle,
   a buckle strap having a buckle affixed thereto for fastening to the latch plate, the buckle strap being pivotably connected with the mounting bracket,
   a pivot pin for connecting the mounting bracket and the buckle strap and permitting the pivotable motion therebetween allowing the buckle strap to be moveable within a range of pivotable movement relative to the bracket, and
   a torsional coil spring wrapped around the pivot pin for biasing the buckle strap, the spring having a first end engaging the buckle strap and a second end engaging the mounting bracket, the first end further engaging a surface of the mounting bracket causing the buckle strap to be maintained in the mounting position and being disengageable from the surface to allow the buckle strap to move to positions within the range of pivoted positions.

19. The seat belt buckle assembly according to claim 18 wherein the surface is a projection.

20. The seat belt buckle assembly according to claim 18 wherein the spring first end passes through an aperture formed by the buckle strap to engage the mounting bracket surface.

21. The seat belt buckle assembly according to claim 18 further comprising the buckle assembly having a pair of buckles linked together for movement together.

* * * * *